United States Patent [19]

Briar

[11] 4,314,671

[45] Feb. 9, 1982

[54] PRESSURE JET SPRAY APPARATUS

[76] Inventor: Jack E. Briar, Box 55, Gardner, Kans. 66030

[21] Appl. No.: 104,548

[22] Filed: Dec. 17, 1979

Related U.S. Application Data

[63] Continuation-in-part of Ser. No. 949,414, Oct. 10, 1978, abandoned.

[51] Int. Cl.³ .......................... B05B 7/30; B05B 7/06
[52] U.S. Cl. .................................. 239/311; 239/316; 239/318; 239/427.5; 239/530
[58] Field of Search ................... 239/67, 68, 310, 311, 239/316, 318, 335, 424, 416.1, 427.5, 530; 417/28, 38, 44; 137/602, 892, 893, 896, 897, 898

[56] References Cited

U.S. PATENT DOCUMENTS

| | | | |
|---|---|---|---|
| 1,763,046 | 6/1930 | Heimburger | 239/311 X |
| 2,310,633 | 2/1943 | Heimburger | 239/427.5 X |
| 2,322,296 | 6/1943 | Hunter | 239/311 |
| 2,743,134 | 4/1956 | Smith | 239/311 |
| 3,066,875 | 12/1962 | Obidniam | 239/318 X |
| 3,446,238 | 5/1969 | Norstrud et al. | 417/28 X |
| 3,773,065 | 11/1973 | Mattox | 239/310 X |
| 3,799,440 | 3/1974 | Goss et al. | 239/424 X |
| 3,810,787 | 5/1974 | Yoeli et al. | 239/310 X |

Primary Examiner—Jeffrey V. Nase
Attorney, Agent, or Firm—Fishburn, Gold and Litman

[57] ABSTRACT

A pressure jet spray cleaning apparatus having a body member or structure with an elongate passageway for air having an inlet for connection to a source of air pressure and a water passageway having an inlet for connection to a source of water supply with each of the water passageway and air passageway having flow control means for selectively controlling the quantity of water and air moving therethrough. At least a portion of the passageways are arranged with the air passageway inside of and concentric with a water passageway with each having a nozzle in line with the discharge of the air nozzle and spaced from the water discharge end to form a venturi therebetween. The source of water supply may be from a utility water service preferably includes a power driven impeller booster pump with controls and a pressure switch means adjacent the pump outlet for interrupting the operation of the pump when the pressure is above a predetermined amount, a detergent supply may be connected to the water supply upstream from the pump with suitable control and check valves; also a detergent container is mounted on the body and has a discharge connected to the water passageway with a flow control means and check valve means therein to selectively control the amount of detergent applied to the water flow and to prevent reverse flow from the water passageway to the detergent container. With the alternative detergent supply water or air or combinations thereof may be selectively discharged on the surfaces to be cleaned and detergent selectively applied with the air or water and air to facilitate cleaning of such surfaces.

8 Claims, 7 Drawing Figures

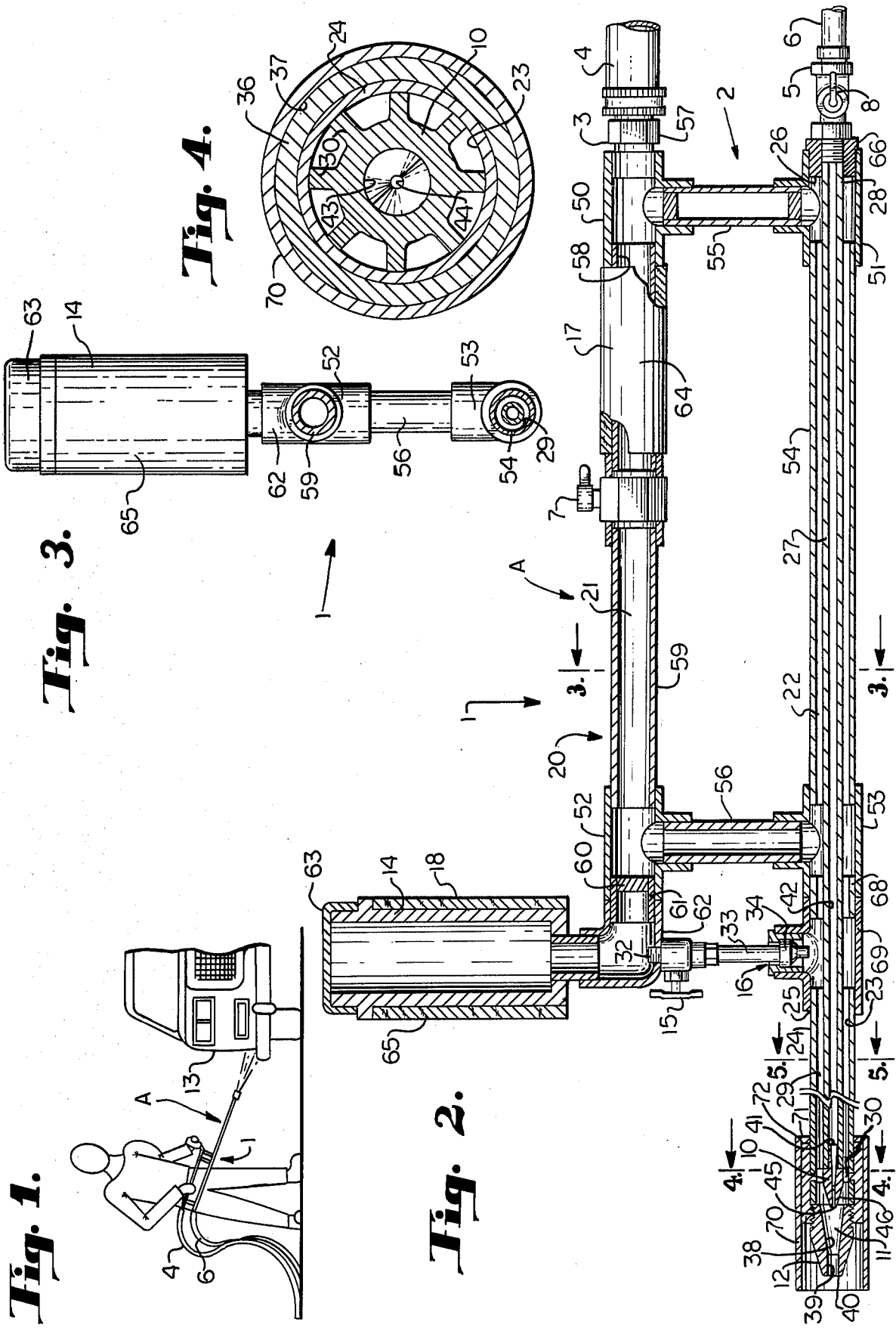

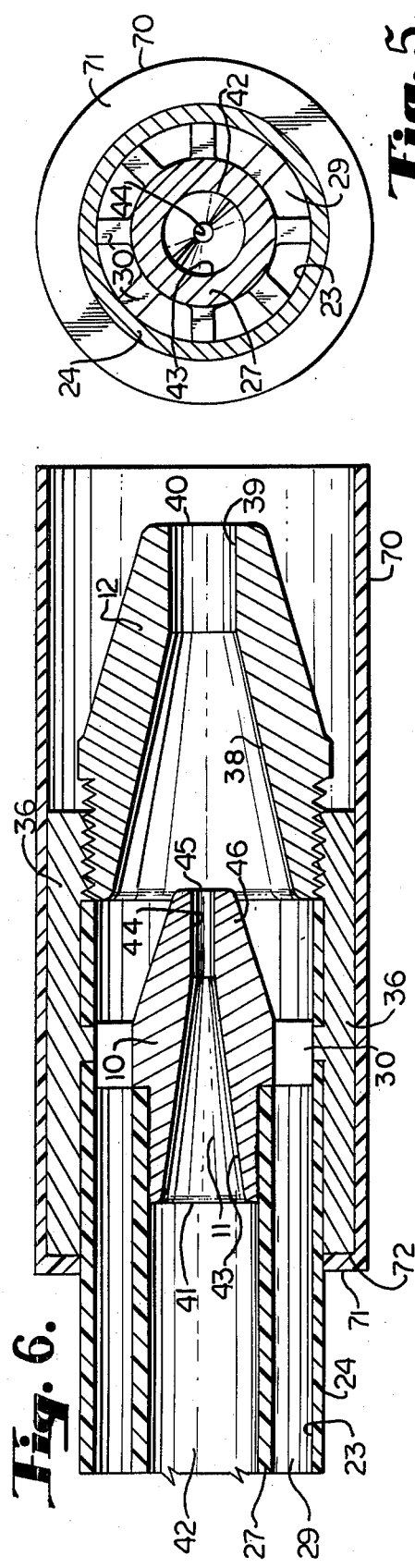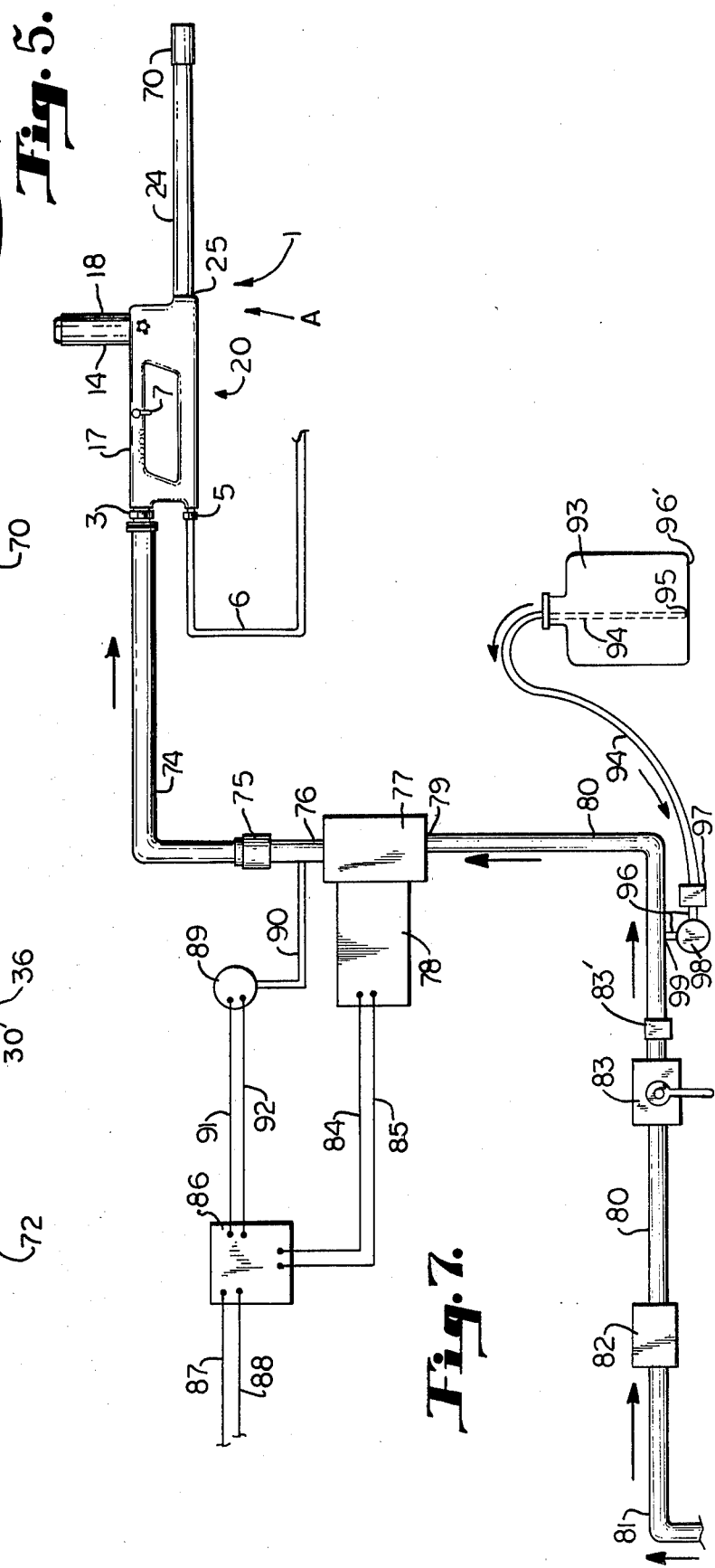

PRESSURE JET SPRAY APPARATUS

This is a continuation-in-part of application Ser. No. 949,414, now abandoned.

The present invention relates to spray cleaning apparatus and more particularly to a pressure jet spray cleaning apparatus for cleaning equipment surfaces such as engines, mowers, vehicles and the like.

The principal objects of the present invention are to provide a pressure jet spray cleaning apparatus selectively using water, air under pressure and detergent individually and in combinations for cleaning and/or drying surfaces; to provide such a cleaning apparatus having a discharge or gun portion that is hand held in directing water and air under pressure against a surface to be cleaned with said gun portion having nozzles wherein the air under pressure is discharged through a venturi to the water nozzle in a manner to include flow of water and break it up into particles which are driven at high speed against the surface to be cleaned; to provide such a cleaning apparatus in which the air, water and detergent supplies are individually and selectively controlled to provide desired mixtures thereof for application to surfaces to be cleaned; to provide such a cleaning apparatus using water from conventional house or business water service and air from a compressed air supply at pressures from 50 to 100 pounds per square inch; to provide such a cleaning apparatus where in the water supply from the water service includes a power driven impeller booster pump to raise the water delivered to the gun to pressures from 100 to 125 pounds per square inch; to provide such a cleaning apparatus with controls including a pressure switch responsive to water pressure adjacent the booster pump outlet to interrupt the operation of the pump when the pressure is above a predetermined amount; to provide such a cleaning apparatus in which any suitable liquid form detergent may be used and selectively applied in concentrated form with air or at suitable dilution with air and water mixtures for effective surface coverage and which, after a desired period of contact with the surface and soil thereon, may be removed with a pressure jet spray of water and air; to provide such a cleaning apparatus which is inexpensive to fabricate, light in weight, convenient to use and which is sturdy in construction and can be employed by relatively unskilled personnel and which may be employed in any location where water and air under pressure are available for cleaning of surfaces and after the cleaning, drying of same by blowing the water droplets therefrom with the air pressure.

Other objects and advantages of this invention will become apparent from the following description taken in connection with the accompanying drawings wherein are set forth by way of illustration and example certain embodiments of this invention.

The drawings constitute part of the specification and include exemplary embodiments of the present invention and illustrate various objects and features of the cleaning apparatus.

FIG. 1 is a perspective view of a pressure jet spray cleaning apparatus in a position to direct cleaning materials against a surface to be cleaned.

FIG. 2 is a longitudinal sectional view through the spray cleaning apparatus.

FIG. 3 is a transverse sectional view through the cleaning apparatus taken on the line 3—3, FIG. 2.

FIG. 4 is an enlarged transverse sectional view through the nozzle structure taken on the line 4—4, FIG. 2.

FIG. 5 is an enlarged transverse sectional view through the tubular members defining the water and air passageways taken on the line 5—5, FIG. 2.

FIG. 6 is an enlarged longitudinal sectional view through the nozzle structure and portions of the tubular members connected thereto.

FIG. 7 is a diagramatic view of the spray cleaning apparatus and water pressure supply and controls therefor.

Referring more in detail to the drawings:

As required, detailed embodiments of the present invention are disclosed herewith, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

The reference letter A generally designates a pressure jet spray cleaning apparatus including a discharge or gun portion 1 that has an inlet end 2 with one inlet connection 3 adapted to be connected to a source of water, as for example a hose 4 supplied by water from a house or building water service. The apparatus has an inlet connector 5 adapted to be connected to an air supply, as for example a hose 6 supplied by a source of compressed air, supplying air under pressure of fifty to one hundred pounds per square inch. High pressures could be used, however it would require more complicated or larger compressor equipment, therefore it is preferred that the maximum pressure utilized is from one hundred to one hundred twenty-five pounds per square inch. The water flow in the gun portion 1 is individually and selectively controlled by a flow control valve 7. The air flow is individually and selectively controlled by a flow control 8. The discharge end of the gun portion 1 has a nozzle structure wherein air is delivered through a first nozzle 10 in a high velocity jet through a venturi area 11 for mixing with water and propelling same through a second nozzle 12 in a high velocity jet of air and small water droplets to a surface 13 to be cleaned. The gun portion 1 may also include a detergent container 14 arranged for supplying detergent to water or air flow with the detergent being controlled by a flow valve 15 and a check valve structure 16 to permit detergent to flow or be drawn into the water or air stream but prevent the water from passing back to the detergent container. The gun portion 1 also includes spaced portions 17 and 18 that serve as handles for manipulating and moving the apparatus. It is preferred that the hoses 4 and 6 be relatively long to permit the cleaning apparatus and the gun portion 1 thereof to be moved around and suitably directed toward surfaces to be cleaned.

In the structure illustrated the gun portion 1 includes a body member 20 having the water and air connections 3 and 5 spaced apart at the inlet end for convenience of connection to the supply hoses 4 and 6 respectively. The water connection communicates with a first water passageway 21 which delivers water to a second water passageway 22, in line with an axial bore 23 through an elongate tubular member 24, having one end connected as at 25 to the body member 20 and the other end having the nozzle 12 thereon. The passageway 22 at the inlet end of the body member is closed as at 26. The gun portion 1 is provided with an air tube or duct 27 positioned inside of and concentric with the tubular member 24. The tube 27 has an inlet end 28 connected with the air supply and in the structure illustrated the flow control valve 8 is positioned at the inlet end 28 of the tube 27 and serves as the inlet 5 to which the air supply, such as hose 6, is connected. The discharge end of the tube 27 has the nozzle 10 mounted thereon. The tube 27 is smaller than the bore 23 of the tubular member 24 providing an annular passage 29 for flow of water toward the nozzle and in the structure illustrated the nozzle member 10 has a plurality of circumferentially spaced ribs 30 engaging the inside of the tubular member 24 to provide support for the discharge end of the air tube 27 and air nozzle 10 with a minimum of impedence to the movement of water to the venturi area 11.

The detergent container 14 may be separate, but in the illustrated structure in FIGS. 1, 2 and 3 it is mounted on the body member and has an outlet 32 to which an adjustable valve 15 is connected to control the flow of detergent to a tubular member 33 that is connected to a portion of the body member for delivery of detergent to the water passage 22. In the illustrated structure the tubular member 33 and connection to the body member has a check valve 34 that operates to permit flow to the water passage 22 but prevents flow from the water passage toward the detergent container 14.

In the nozzle structure the nozzle member 12 is suitably secured to the tubular member 24 as by a coupling 36 utilizing, for example, screw threads, whereby said nozzle member 12 is removable, or adhesive. The coupling 36 has an opening 37 substantially the size of the external diameter of the tubular member 24. The nozzle bore 38 is tapered converging toward the outlet end where it merges into a straight discharge opening 39 that extends to the discharge end 40 of the nozzle. The air nozzle 10 has a portion substantially the size of the bore 42 of the air tube 27 and is suitably secured thereto as by adhesive on the like. The air nozzle 10 has an inlet opening 41 substantially the size of the bore 42 of the air tube 27. The bore 43 of the air nozzle being tapered and converging toward the discharge end thereof, merging into a straight passage or orifice 44 that extends to the discharge end 45 of the air nozzle. The outer surface 46 of the air nozzle is also tapered inwardly toward the discharge end at a greater angle than the taper of the bore of the water nozzle and the discharge end 45 of the air nozzle is spaced inwardly from the discharge orifice of the water nozzle to form the chamber therein, around and forwardly from the air nozzle providing the venturi 11 wherein the air discharge from the air nozzle induces the flow of water and increased speed thereof through the water nozzle orifice. This venturi action will also tend to draw the water through the annular passage 29 and when the detergent valve 15 is opened it also applies sufficient suction to induce flow of detergent from the detergent container to the water flow in the annular water passage 29.

The body member may be injection molded with suitable synthetic resin or it may be fabricated as is the particular structure shown in the drawings wherein it is constructed of suitable tubing and fittings which are easily available and economically assembled using adhesive to secure the tubular portions in the fittings. The tubular members 24 and 27 maybe of suitable synthetic resin, and the nozzles may also be of suitable synthetic resin, however, it is preferred that the nozzles be of long wearing metal such as brass or stainless steel. In the particular structure illustrated, the T-fittings 50 and 51, and 52 and 53 are arranged with a tube 54 extending between and connected to adjacent ends of the T-fittings 51 and 53. Lateral branches of the T-fittings 50 and 51 are connected by a member 55 which may be solid or a tube with ends plugged and the adjacent lateral branches of the T-fittings 52 and 53 are connected by a tubular member 56. The branch at the inlet end of the T-fitting 50 has a female hose connection 57 secured therein to form the inlet water connection. The opposed branch is connected to a tubular member 58 which has the other end mounting the water flow control valve 7 which preferably is of conventional structure operated by a lever. The other end of the valve is connected by a tubular member 59 to the adjacent branch of the T-fitting 52. The opposed branch of the T-fitting 52 is closed as at 60 but also has a tubular member 61 mounting one end of an elbow 62 with the other end turned upwardly and mounting the detergent container 14 thereon.

The upper end at the detergent container preferably has an open end which is closed by a suitable cap 63. The tubular member 58 and the detergent container are preferably covered by a cork or other suitable covering as at 64 and 65 to provide a non-slip handhold to serve as handholds in handling the apparatus. The inlet end or branch of the T-fitting 51 has a bushing 66 to close the end of the passage 22 and provide a mounting for the inlet end of the air tube 27 to which is connected the air flow control valve 8. The outlet end of the T-fitting 53 is connected by a tubular member 68 to a T-fitting 69 with the outlet end thereof connected to the tubular member 24. The detergent valve 15 is connected to the elbow 62 and the tubular member 33 and check valve structure 34 are connected to the lateral branch of the T-fitting 69 for communication of the detergent to the annular water passage 29. With this structure the water flow is from the source hose 4, through the fitting 57, passages in the T-fittings 50, 52 and 53 and the tubular members 58, 59 and 56 to the passage 22 which connects to the annular passage 29, and the air flow is directly from the hose air supply 6 through the valve 8 and air tube 27 to the air nozzle 10.

In the structure illustrated the nozzle end of the gun portion 1 has a shield member 70 in the form of a tubular member that fits the outside of the coupling 36 with a flange 71 engaging an end 72 of said coupling. The shield member extends longitudinally outwardly from the discharge end of the nozzle 12 and is spaced therefrom does not interfere with the air, water and detergent spray combinations. The shield does protect the user from fine spray, but more particularly it protects the nozzle from damage by impacts or stoppage as by striking objects being cleaned and the like and insertion into soft dirt or other material that might enter the orifice when the air and water pressure is shut off.

In cleaning surfaces it is always preferable to have warm water, however the present apparatus is designed to be used with water available from the house or business water service at conventional pressures available in such water services. For economical operation the air pressure is preferred to be between fifty and one hundred pounds operating pressure and while the pressures may be higher, for economical reasons it is preferred that the maximum pressure be not more than one hundred twenty-five pounds per square inch. For efficient operation it is preferred that the area of the annular water passage 29 be greater than the area of the air flow passage 42 and it may be from one to three times greater than the air flow passage area. For optimum operation the orifice in the air nozzle is preferably in the nature of 0.060 inches to 0.080 inches in diameter and preferably about 0.073 inches in diameter with the straight portion of the orifice being approximately 0.250 inches in length and that the discharge end of the air nozzle be spaced upstream from the discharge orifice in the nature of eight/tenths of an inch to one and three/eights inch and preferably about 1.235 inches. The water discharge nozzle 12 has an orifice preferably in the nature of 0.225 inches to 0.275 inches in diameter and the straight portion of the orifice approximately 0.300 inches in length. For optimum results there should be a relationship between the orifices with the discharge orifice of the air nozzle being in the nature of one/fourth to one/third of the diameter of the discharge orifice of the water nozzle. It has been found that with these relationships and air pressures of eighty to one hundred pounds with the water valve and air valve open, the air will induce flow of water by the venturi action, mixing therewith to break the water into small particles and drive same at high speed in a forceful jet action that will remove soil from surfaces. The closer the nozzle is held to the surface being cleaned the more force is applied, however for most uses it is preferred that the nozzle be held from six to ten inches from the surface being cleaned with the jet spray being directed at an acute angle to the surface.

The particular method of using the apparatus in cleaning surfaces may be varied and the particular detergent used may be varied in accordance with the type of soil to be removed. As for example, ordinary dirt accumulations could be used with conventional soap-type detergents. With oil and grease coatings the detergent should also contain solvents to aid in disolving and removing same. In using a cleaning apparatus constructed as described the water inlet 3 is connected to a suitable source of water as by an elongate hose 4. The air inlet is connected to a suitable source of compressed air as by an elongate air hose 6 with the hoses being of suitable length for maneuvering the gun portion 1 around the work to be cleaned. The cover 63 is removed from the detergent container and the container filled with suitable detergent. These preliminary connections are all made with the valves 7, 8, 15 and 34 closed. It is usually preferred to wet the surface to be cleaned and therefore the valve 7 is opened and the air valve 8 partially opened to give a low velocity water to coat the surface. If the soil is such that detergent is not needed the water valve is left open and the air valve 8 opened to provide additional air supply to increase the velocity of the jet spray directed on the surface to be cleaned and the gun portion 1 moved around to gradually blast the soil from the surface. After the cleaning is complete the water valve 7 is closed and the air alone is blown on the surface to blow the water therefrom and dry same, or if fast drying is not desired the use of the air alone can be eliminated and allow the surface to air dry. When detergent is needed a concentrated form can be applied by opening the valve 15, which is preferably a needle valve, and turning on some air, whereby the air will induce the flow of the detergent from the detergent container through the valve 15, duct 33 and check valve 34 to the annular passage 29 and out through the nozzles applying a concentrated foam-like coating on the surface to be cleaned. It is usually preferable to have some dilution of the detergent and therefore the water valve 7 would be partially opened to allow some water to flow through the water passageway to mix with the detergent as the flow thereof is induced by the air and discharged through the nozzles. With the air valve 8 off and the water valve 7 on the water flow through the passageway 29 does not draw detergent into the flow, the check valve 34 merely closes. Air flow is required to create a suction or draw detergent from the container 14, valve 15, duct 33 and check valve 34. After coating the surface with suitable detergent the detergent valve 15, water valve 7 and air valve 8 are all closed, allowing the detergent to act on the soil on the surface. After a suitable time the water valve 7 and the air valve 8 are opened to discharge a mixture of water and air in a high pressure spray to blast the detergent and soil from the surface. After any cleaning operation the surface may be dryed by using only the air directed through the nozzles to blow water from the surface that has been cleaned. The air is also particularly important in cleaning engines and the like to remove the water from any of the electrical components of the engine. Each of the water valve, air valve and detergent needle valve are adjustable to control the flows of the respective materials. The water valve is immediately forward of the handhold 17 so that a finger of the hand can move the lever of the water valve to vary the water applied in the cleaning operation. By suitable control of the water, air and detergent, the application thereof to the surface to be cleaned may be varied to accommodate the various soil types and conditions for rapid removal and cleaning of the surface.

The pressure jet spray cleaning apparatus disclosed diagramatically in FIG. 7 provides a more powerful, faster cleaning with options regarding operation particularly adapting such structure for heavy duty industrial cleaning. As shown in FIG. 7 the gun portion 1 of the cleaning apparatus is the same as shown and described relative to FIGS. 2 to 6 inclusive. The gun portion has the inlet and 2 with a connection 3 to a water supply hose 4 and a connection 5 to an air supply hose 6. The water supply hose 4 is preferably connected as at 74 to a connector 75 on a outlet pipe 76 of a pump 77 preferably of rotary impeller type suitably driven by a power means such as an electric motor 78. The inlet 79 of the pump 77 is connected by a hose 80 or pipes or combinations thereof to a building water supply service 81, however if there is no available utility water source the supply pipe 81 may be connected to a water tank, or other suitable supply. A check valve 82 is arranged in the hose 80, said check valve being operable to prevent any water from backing up from the hose 80 into the source of the water supply. A suitable cut-off valve 83 such as a lever actuated ball valve is in the line 80 between the check valve 82 and the pump inlet 79, said cut-off valve is to control the water supply to the system, the use of the water in the operation of the gun portion 1 for control of the air and water delivery through the spray nozzles is by the valves 7 and 8 respectively.

The motor 78 for driving the pump 77 is suitably connected by conductors 84 and 85 to a relay 86 which receives its electric current through conductors 87 and 88 connected to a suitable source of electric power. A pressure responsive switch 89 is connected by a pipe 90 to the pipe 76 adjacent the pump outlet, whereby the pressure switch mechanism 89 is responsive to the pressure at the discharge of the pump 77. The pressure switch is connected by conductors 91 and 92 to the relay 86 and the pressure switch 89 being responsive to pressure of a predetermined upper limit at the discharge of the pump is actuated thereby and provides a current to the relay to open the switch to the motor and thereby stop operation of same and the pump 77. This can particularly occur when the operator of the gun portion 1 closes the water valve 7, stopping delivery of water to the spray nozzles. This could result in an excessive build up of pressure that could damage the system. It is preferred that the pressure responsive switch 89 be set to be responsive to a pressure of approximately 200 pounds per square inch to shut off the motor and pump. When the water valve 7 is again opened the pressure downstream from the pump will be immediately lowered so that the pressure responsive switch 89 then actuates the circuit and the relay 86 to again supply electric energy to the motor 78 to again drive the pump 77 to boost the water pressure upwardly from that of the water source.

While the gun portion 1 has a detergent container 14 it is limited in size in order to keep the weight of the gun portion at a minimum for ease in handling. In large cleaning operations or industrial cleaning it is desirable to have a larger supply of detergent, therefore in the apparatus as illustrated in FIG. 7 a detergent container 93 which may be of any suitable shape or size, has a tube 94 with an inlet 95 adjacent the bottom 96, of the container 93. The tube 94 is connected by a hose or the like 96 having the other end connected as at 99 to the pipe 80, said connection 99 being between the control valve 83 and the pump inlet 79. For control of delivery of detergent from the container 93, a volume control valve such as a needle valve 97 is located in the tube 94 and a check valve 98 is in the tube 96 between the needle valve 97 and the connection 99 to the pipe on hose 80.

It is found that when the booster pump 77 is operating it reduces the pressure or provides a negative pressure in the line 80 so that the check valve 98 opens and, as permitted by the valve 97, detergent can be drawn from the container 93 into the water line 80, to move through the pump and on to the inlet connection 3 of the gun portion 1. The use of the detergent in the container 93 is limited to the time when the pump is operating. If the system is operating on city water pressure or the like in the line 81 the check valve 98 will close, preventing the water from moving into the container 93. A substantial flow of water from the supply through the line 80 will also cause the check valve 98 to remain closed. In order to be assured that chemical or detergent will be drawn from the container 93 into the water in the pipe 80 when the pump 77 is operating, the water flow in line 80 downstream from the valve 83 must be controlled so that the pump suction creates a negative pressure at check valve 98 to effect opening of same for drawing detergent into the line 80. A structure providing such action is a modified valve 83' operative so that when open, the line 80 is fully opened for full flow of water therethrough, but when closed, it exposes a hole of a diameter of about 7/32 to 3/16 inch in diameter which allows some water to flow through the opening or hole to the pump. In such operating conditions, the pump is capable of pumping more water than the hole in the control valve will allow to pass therethrough, thereby creating negative pressure or vacuum in the line 80 between the control valve 83 and the pump 77. This negative pressure causes the check valve 98 to open and the chemical or detergent to be drawn into the incoming water line 80. With this arrangement, chemical or detergent can be applied to the surface to be cleaned with air only, utilizing the detergent container 14. Also, with the valve 15 closed and the control valve 83 in closed position with the hole through the valve exposed, the chemical or detergent will be drawn into the water line 80 and thereby mix with a relatively small quantity of water for application to the surface to be cleaned.

With the cleaning apparatus as illustrated and described relative to FIG. 7, the water pressure is boosted or increased from a normal city pressure of 30 to 50 pounds per square inch, to approximately 125 pounds. With this higher pressure of water and the arrangement of the air and the detergent the apparatus is capable of efficient, fast cleaning for industrial purposes that would normally be expected from high pressure spray wash systems using high pressure piston pumps. Also, the system, as shown in FIG. 7 provides alternative methods of application and use of detergents or chemical to accommodate the many sizes of cleaning projects that may be undertaken.

It is to be understood that while I have illustrated and described certain forms of the invention, it is not to be limited to the specific forms or arrangement of parts herein described and shown.

What I claim and desire to secure by Letters Patent is:

1. A pressure jet spray cleaning apparatus comprising:
   (a) an elongate body member having a passageway longitudinally thereof for passing liquid under pressure and having an inlet end and an outlet end;
   (b) a first nozzle means at said outlet end having a first restricted discharge orifice in the nature of 0.225 to 0.275 inches in diameter disposed concentrically of said passageway, said nozzle means having a tapered bore communicating with the passageway at the outlet end thereof and with surfaces thereof converging to said restricted orifice;
   (c) means to connect said inlet end to a pressurized water supply source and having a flow control means therein;
   (d) an elongate tube mounted concentrically in said passageway and spaced inwardly thereof whereby the water flow passageway is between the tube and body member, said tube having an air flow passageway therein with an inlet end and an outlet end;
   (e) said water flow passageway having a cross-sectional area in the nature of one to three times the cross-sectional area of the air flow passageway;
   (f) means to connect said tube inlet end to a pressurized air supply source delivering a pressure of 50 to 125 pounds per square inch and having a flow control means therein; and
   (g) an air nozzle means at said outlet end of said tube and having a restricted air discharge orifice in the nature of 0.060 to 0.080 inches in diameter, said air nozzle means having a tapered bore communicating with said air flow passageway with surfaces thereof converging toward the air discharge orifice, said air nozzle means having the respective discharge orifice spaced longitudinally upstream from said first discharge orifice in the nature of 0.900 to 1.375 inches and a tapered outer surface spaced inwardly from the surfaces of the tapered bore of said first nozzle means defining a venturi with air from the air nozzle mixing with and impelling water and air from the restricted discharge orifice of said first nozzle means.

2. A pressure jet spray cleaning apparatus as set forth in claim 1 and including:
(a) a detergent container having an outlet passage communicating with said water flow passageway between the first nozzle means and the flow control means of the water connection means; and
(b) detergent flow control means in said outlet passage operative to permit controlled flow of detergent to said water flow passageway and prevent flow from said passageway toward the detergent container.

3. A pressure jet spray cleaning apparatus as set forth in claim 2 wherein said detergent flow control means includes:
(a) a control valve in said outlet passage for controlling the detergent flow; and
(b) a check valve in said outlet passage between said control valve and water flow passageway operating to permit flow of detergent to the water flow passageway and prevent flow from said passageway toward the detergent container.

4. A pressure jet spray cleaning apparatus as set forth in claim 1 wherein:
(a) said body member has portions providing handholds and extended outwardly thereby in longitudinally spaced apart relation; and
(b) one of said portions providing handholds being adjacent the water flow control means and extending longitudinally of said body member.

5. A pressure jet spray cleaning apparatus as set forth in claim 4 wherein:
(a) said water flow control means is a lever actuated valve; and
(b) the other of said portions providing handholds extends from said body member and is positioned between the said one of said portions providing handholds and said first nozzle means and extends from said body member substantially at a right angle.

6. A pressure jet spray cleaning apparatus as set forth in claim 1 wherein:
(a) said restricted discharge orifice of said air nozzle means is in the nature of $\frac{1}{4}$ to $\frac{2}{3}$ of the diameter of the discharge orifice of the water nozzle means.

7. A pressure jet spray cleaning apparatus as set forth in claim 1 wherein:
(a) said restricted discharge orifice of said first nozzle means is in the nature of 0.250 inches in diameter;
(b) said restricted discharge orifice of said air nozzle means is in the nature of 0.073 inches and is spaced upstream from the orifice of the first nozzle means in the nature of 1.235 inches; and
(c) the water flow passageway has a cross-sectional area in the nature of twice the cross-sectional area of the air flow passageway.

8. A pressure jet spray cleaning apparatus comprising:
(a) a first elongate body member having a passageway longitudinally therethrough for flow of water under pressure and having an inlet end and an outlet end, said inlet end with means for connection to a source of pressurized water and a water flow control means therein;
(b) a second elongate body member positioned in parallel relationship to said first elongate body member and having a length substantially greater than the length of said first elongate body member;
(c) said second elongate body member having a passageway longitudinally therethrough and including an inlet end and an outlet end, said inlet end with a means for connection to a source of pressurized air and an air flow control means therein;
(d) an elongate tube having inlet and outlet ends and mounted concentrically in the passageway of said second elongate body member and communicating with the inlet end of said second elongate body member;
(e) first and second support members respectively positioned adjacent the inlet and outlet ends of said first elongate body member and connecting said first and second body members together in parallel relation;
(f) a water flow passage through said second support member and communicating said passageways in said first and second elongate body members; whereby water flows through the passageway in said second elongate body member and about said tube;
(g) a detergent dispenser means connected to said first elongate body member and having a passage communicating with said passageway through said second elongate body member at a position between said second support member and the outlet end of said second elongate body member;
(h) a first nozzle at the outlet end of said tube and having a first restricted air discharge orifice disposed concentrically of the passageway through said second elongate body member, said first nozzle having a tapered bore communicating with the interior of the tube and with surfaces converging to said restricted air discharge orifice;
(i) a second nozzle at the outlet end of said passageway through said second elongate body member and having a restricted discharge orifice for passage of air and liquid, said second nozzle having a tapered bore with surfaces converging toward the discharge orifice, the orifice of said second nozzle being spaced longitudinally downstream from the orifice of said first nozzle for passage of pressurized air with water and detergent; and
(j) a protective nozzle cap shield member fitted over said second nozzle and adjacent the outlet end of said second elongate body member.

* * * * *